Marinus Newhouse, Jr.
INVENTOR
BY
Kolisch + Hartwell
Attys.

May 5, 1970   M. NEWHOUSE, JR   3,509,924
BALE-SHREDDING MACHINE
Filed Oct. 26, 1967   3 Sheets-Sheet 2
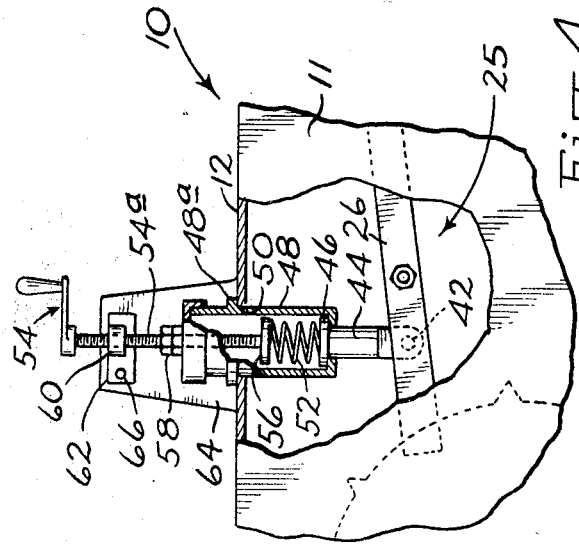
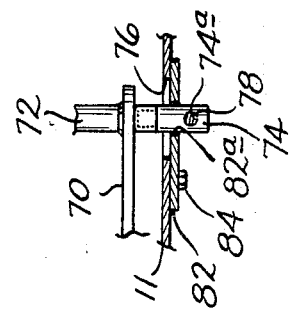
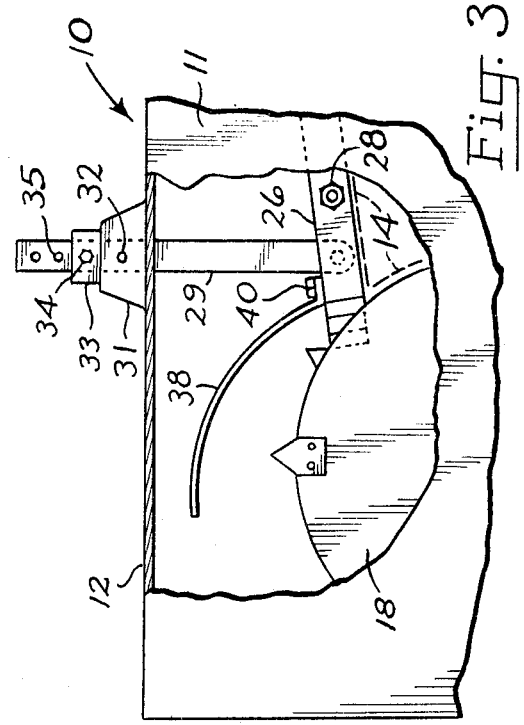
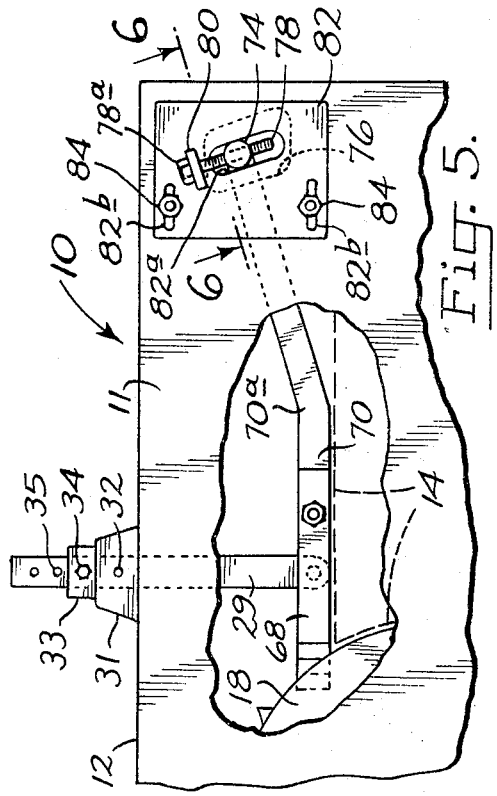
Marinus Newhouse, Jr.
INVENTOR
BY
Kolisch & Hartwell
Attys.

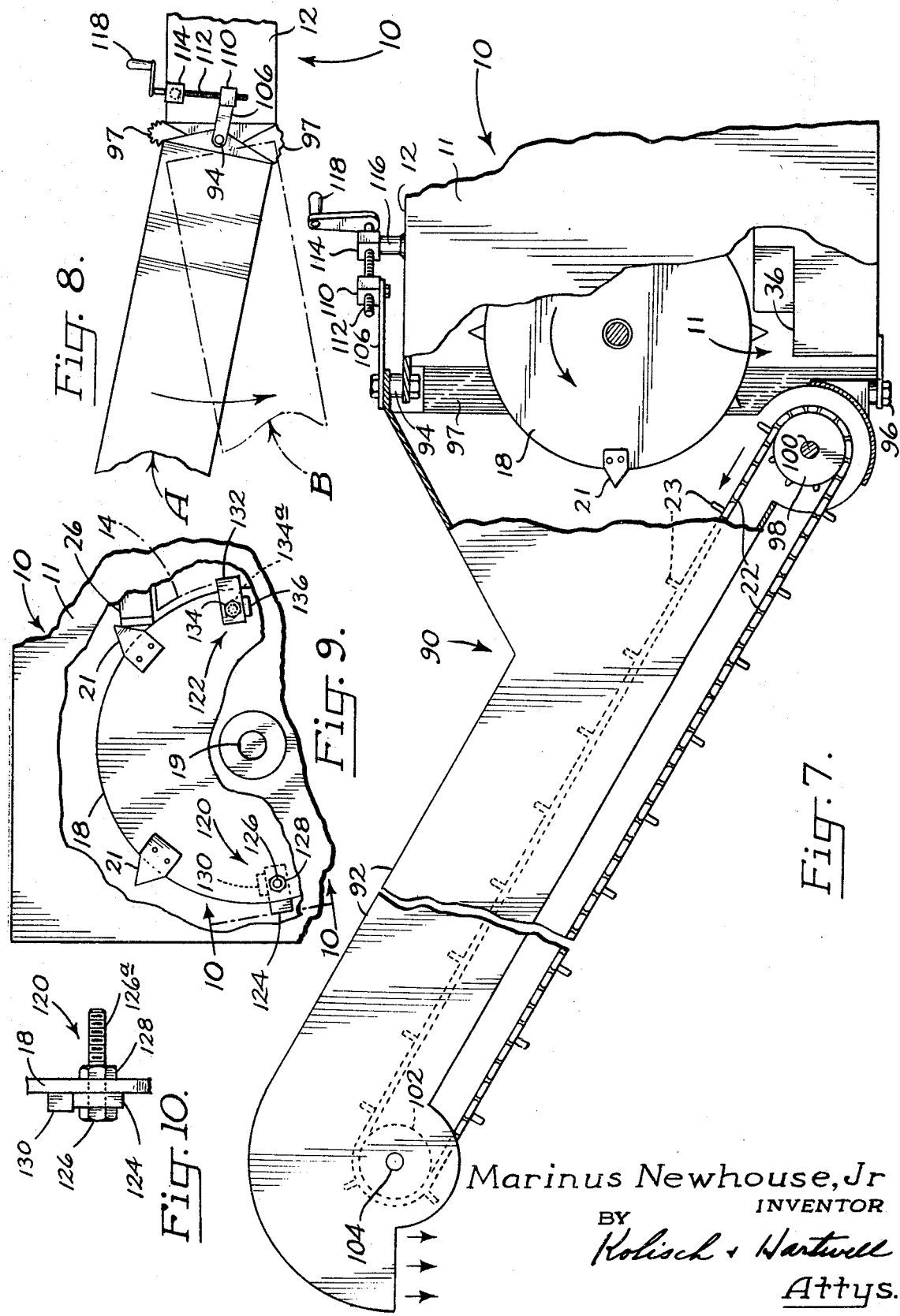

United States Patent Office 3,509,924
Patented May 5, 1970

3,509,924
BALE-SHREDDING MACHINE
Marinus Newhouse, Jr., 1048 N. 6th St.,
Redmond, Oreg. 97756
Continuation-in-part of application Ser. No. 570,556,
Aug. 5, 1966. This application Oct. 26, 1967, Ser.
No. 681,307
Int. Cl. A01f 29/00
U.S. Cl. 146—70.1
17 Claims

ABSTRACT OF THE DISCLOSURE

A machine for shredding bale material which may contain foreign matter including a chamber into which bales are fed, rotating cutters having cutterheads which move upwardly against the face of a bale advancing through the chamber, and an elongated hold-down assembly pivotally mounted in the chamber having an end positioned adjacent the cutters which is adapted yieldably to press down against the top of a bale. A yieldable connector organization interconnects the hold-down assembly to the top of the chamber, and permits the hold-down to swing upwardly free of the top of a bale when predetermined upward pressure is applied against the assembly as by foreign matter in the bale. Shredded material is carried away from the chamber by means of a conveyer having its infeed end positioned adjacent the cutters.

---

This application is a continuation-in-part of an application Ser. No. 570,556, filed Aug. 5, 1966, entitled "Bale-Shredding Machine," now abandoned.

This invention relates to a machine for reducing a block or bale of material into a plurality of smaller parts and then discharging such parts. More particularly, the invention is directed to a machine for comminuting or shredding a bale of hay or the like to usable form such as animal fodder. Hay is commonly baled in the fields in which it is grown. Frequently foreign matter such as stones, rocks, etc., become embedded in the baled hay. Later, when it is desired to shred a bale of hay, in the existing equipment for performing such an operation, the foreign matter becomes lodged in the equipment jamming it or otherwise damaging the machinery.

It is also known that when hay is used as animal fodder, it is desirable that it be thoroughly shredded and that the ends of the shredded pieces not be sharp or pointed in order to protect the mouths of feeding livestock. The fodder should also be free of foreign material and particularly pieces of baling wire or other material used to hold a bale of hay together. Prior to shredding of a bale of hay, the baling wire is supposedly removed, but on occasions some wire remains and gets into a machine.

Commonly, the particulate material which results after shredding of a bale is carried away from the cutters producing shredding by what is called an elevator including a traveling conveyer. Such material is usually discharged into stacks on the ground. A further difficulty with conventional machinery is that the usual elevator cannot be adjusted to discharge material at various locations without moving the machinery as a whole. This often results in a considerable amount of time being spent maneuvering equipment from one location to another.

A general object of the invention, therefore, is to provide a novel bale-shredding machine which takes care of the above-indicated difficulties in a practical and satisfactory manner.

More particularly, an object of the invention is to provide a machine that will shred a bale of hay or the like, and, without damage to the machine, clear any foreign matter included in the bale.

Another object of the invention is to shred uniformly a bale of hay into convenient size fodder free of sharp portions and foreign matter.

Generally the objects of the invention are accomplished by providing a machine in which any foreign matter of a size large enough to damage the machine is thrown clear, with smaller foreign material such as baling wire and small stones remaining harmlessly in the machinery chamber or being discharged out its bottom.

According to a feature of the invention, cutters rotate to shred a bale which is held by a hold-down assembly that is pivotally mounted at one end and held at the other end by a yieldable connector organization which will yield upon sufficient pressure being exerted against it, as by a cutter forcing a rock against the assembly, permitting the rock to be thrown clear of the cutters.

According to another feature of the invention a plurality of cutters of different sizes and offset with respect to each other cut into a bale in a V profile insuring complete shredding of the bale into convenient safe fodder. Any baling wire or other binding material left on a bale will tend to remain in the chamber or fall out its bottom rather than be cut up and mixed with the fodder.

The machine according to the invention is of simple, rugged, compact construction and may easily be transported to different locations in fields or elsewhere if it is mounted on a trailer or other movable supporting mechanism.

These and other objects and features will become more fully apparent as the following description is read together with the accompanying drawings, wherein:

FIG. 3 is a fragmentary side elevation illustrating a deflector which is employed in a modified form of the invention;

FIG. 4 is a fragmentary side view showing a modified yieldable connector organization as contemplated herein;

FIG. 5 is a fragmentary side elevation illustrating a modified hold-down assembly constructed in accordance with the invention;

FIG. 6 is a view taken along the line 6—6 in FIG. 5;

FIG. 7 is a partial side elevation illustrating yet another modified form of the invention including an elevator for discharging shredded material with the elevator mounted for swinging from side-to-side about an upright axis;

FIG. 8 is a simplified partial top plan view on a reduced scale illustrating various positions for the elevator in FIG. 7;

FIG. 9 is a fragmentary side view illustrating raker means employed in still another modified form of the invention; and FIG. 10 is a view taken along line 10—10 in FIG. 9.

Figure 1:
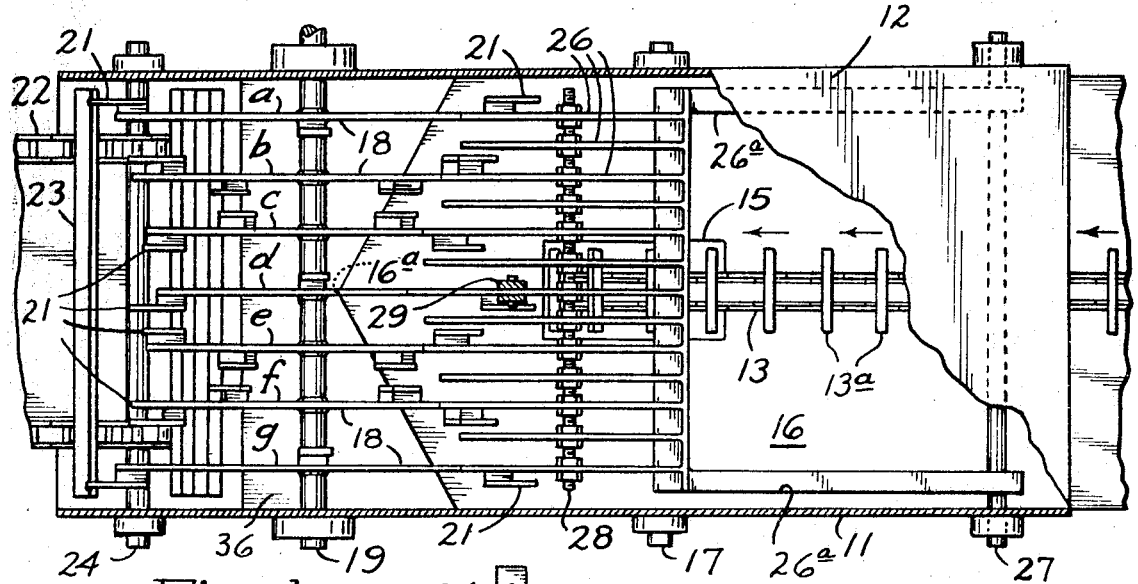
FIG. 1 is a top plan view with portions of the machine broken away.
Figure 2:
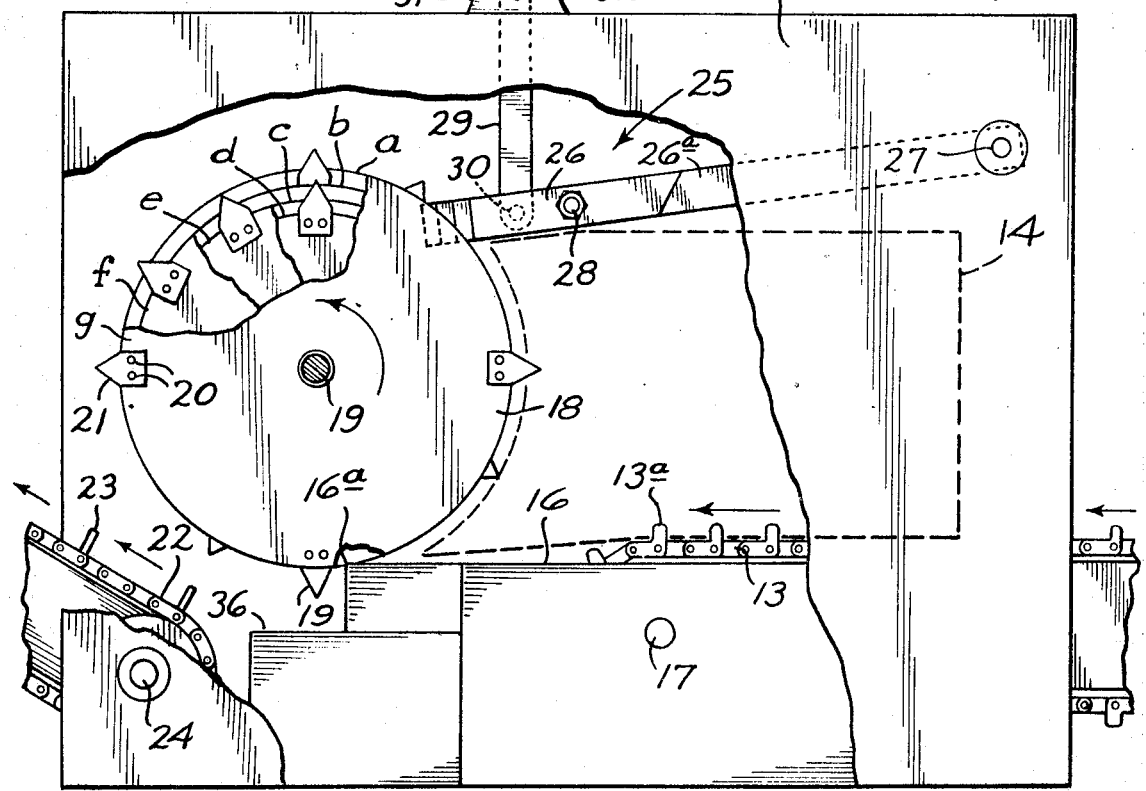
FIG. 2 is a side view partly broken away of FIG. 1.

Turning now to the drawings, and considering first FIGS. 1 and 2, indicated generally at 10 is a chopping or shredding chamber. The chamber and associated mechanism for delivering bales to it and removing shredded material therefrom may be mounted on any suitable supporting mechanism such as a trailer (not shown) for transportation to any desired location.

Chamber 10 is enclosed by sides 11 and top 12. Infeed conveyer chain 13 having lugs 13a is adapted to carry into the chamber bales of hay 14 in the direction shown by the horizontal arrow in FIG. 2. Opening 15 in floor 16 which supports a bale during shredding in the chamber, permits chain 13 to pass back out of the chamber around pivot 17.

The shredding of a bale is accomplished by a plurality of discs 18 mounted on a shaft 19 which is rotated in a counterclockwise direction as shown in FIG. 2 by a suitable drive mechanism (not shown). On the periphery of each disc, there are mounted, as by bolts 20, triangularly shaped cutting elements 21 which are evenly spaced around the periphery of a disc at 90° to each other. Cutters 21 on each disc are offset with respect to the cutters on the adjacent discs so that a bale is always engaged at different angular positions by the cutters. The diameters of discs 18 are of decreasing size from each end toward the center of shaft 19 so that they in effect have a V-shaped profile. Going from top to bottom in FIG. 1 the discs are marked with letters a, b, c, d, e, f, g. The smallest is at the center and marked d, and the other discs are of increasing size up to the two at the ends marked a and g.

The effect of the offset cutting elements on discs of varying diameter is to produce a spiral cutting action on a bale from the outside toward the center which chops and beats the bale into relatively small hay fragments that are neither sharp nor pointed and serve as ideal fodder material. Floor 16 of the chamber is forwardly tapered to a point 16a which corresponds with the V-profile of discs 18 so that a bale will be evenly supported as it is fed to the cutters.

In a preferred embodiment of the invention, the shredded pieces of hay may be deposited on the outfeed belt conveyer 22 having paddles 23 which conveyer is driven by any suitable source of power from a shaft 24 in the direction of the arrows shown at the left side of FIG. 2. Conveyer 22 constitutes means herein for moving shredded material out of chamber 10.

The bale hold-down gate, or assembly, generally indicated at 25 comprises a plurality of spaced rails 26 pivotally mounted at one end by arms 26a to a shaft, or pivot means, 27 which extends through sides 11 of the chamber. Shaft 27 provides a substantially horizontal pivot axis extending transversely of the chamber for assembly 25. A rod 28 extends through rails 26 near their ends remote from shaft 27 and holds them together. Rails 26 vary in length to conform to the varying diameter of discs 18 so that the longest rails are at the center of the chamber and face the inner discs.

Extending upwardly from the end of assembly 25 which is adjacent the cutters is what is referred to herein as yieldable connector means including an upwardly extending arm 29 fastened at its lower end 30 to a centrally positioned rail 26. The upper end of arm 29 extends through a slot in top 12 of the chamber. A stop block 31 is welded to the top around the slot through which arm 29 passes and is adapted to receive shear pin 32 which passes through the arm and stop block 31. Collar 33 with a bolt 34 adapted to pass through one of holes 35 in the upper portion of arm 29 permits adjustment of the hold-down gate depending upon the side of the bale being processed through the chamber.

Referring to FIG. 2, it will be seen that floor 36 directly beneath the cutters is lower than floor 16 and the bottom of the chamber is open where outfeed conveyer 22 comes into the chamber. Pieces of foreign matter such as small stones and bits of wire will clear the machinery by dropping to floor 36 or out the bottom of the chamber. Larger pieces of foreign matter such as rocks will be forced up against assembly 25 and longer lengths of bailing wire may wrap around shaft 19.

Explaining now how the machine so far described operates, as bale 14 is fed into chamber 10 by infeed conveyer 13, the top lead portion of the bale is engaged by rails 26 which hold the bale in shredding position while it is being urged by the conveyer against cutters 21. The shredded material is carried up and over discs 18 by the cutters and deposited on outfeed conveyer 22. In the event that a rock or other foreign matter is lodged in a bale and the foreign matter is too large to pass between the cutters and rails 26 or fall between the discs, it will be forced against the rails. As these rails are moved up the whole gate assembly 25 is raised and arm 29 moves up shearing pin 32. The foreign matter is then carried around by the cutters and is dumped on outfeed conveyer 22 which then carries it out of the machine. Collar 34 prevents the gate from falling down below a desired amount into the chopping chamber after the foreign matter has been cleared.

Considering FIG. 3 of the drawings, this illustrates an arcuate deflector 38 which is employed in a modified shredding machine constructed according to the invention. To simplify the construction, the deflector is mounted on the top of rails 26 by fasteners such as fastener 40, and the deflector extends substantially completely across the width of chamber 10. With the deflector mounted in the manner illustrated, it curves upwardly over the top of discs 18. Such a deflector is desirable in certain applications to help direct shredded material onto conveyer 22 which carries the material out of the chamber.

Turning to FIG. 4, here there is illustrated a modified yieldable connector organization, or means, interposed between hold-down assembly 25 and the top of chamber 10. Thus, pivotally connected to a central rail at 42, and extending upwardly from assembly 25 is an arm 44 having its upper end joined to a piston member 46 mounted for reciprocation inside a cylinder 48. Adjacent its upper end, the cylinder has an outwardly projecting annular flange 48a. The cylinder is freely received in a bore 50 provided in top 12 with flange 48a normally seating against the top face of top 12. Provided inside cylinder 48, and seated against the top face of piston 46, is a spring, or biasing means 52.

Also forming part of the yieldable connector means is a crank 54 having a threaded shaft portion 54a. The lower end of shaft 54a extends downwardly through an appropriate bore provided in the top end of cylinder 48 and is joined to a plate 56 which seats against the top end of spring 52. Shaft 54a and cylinder 48 are locked together by means of a locking nut 58. The upper part of shaft 54a is received in a guide nut 60 which is secured to a plate 62, that is in turn fastened to a bracket 64 by a shear pin 66. Bracket 64 is welded to the top face of top 12. Crank 54, in operative relationship with nut 60 and plate 62 is referred to as infinitely adjustable means.

With the modification shown in FIG. 4, through turning of crank 54, the vertical position of hold-down assembly 25 relative to the cutters may readily be adjusted to accommodate bales of different sizes. Upon a rock or other foreign matter being forced against rails 26, if only a small impact is produced on the rails, arm 44 and member 46 move upwardly in cylinder 48 against spring 52 to allow the foreign matter to be thrown clear of the cutters. If a greater impact results causing member 46 completely to collapse spring 52, pin 66 shears in much the same manner as that described for previously-mentioned shear pin 32. Flange 48a functions in substantially the same manner as previously-described collar 33.

Turning now to FIGS. 5 and 6, these illustrate a modified hold-down assembly. This assembly comprises a plurality of spaced rails 68 which correspond to previously-described rails 26. Rails 68 are joined to a pair of elongated arms, such as arm 70, that extend along opposite sides of the chamber. Each arm 70 is provided with a bend, such as the one shown at 70a, which permits rails 68 to lie in a substantially horizontal plane against the top of a bale, such as bale 14. Arms 70 are connected to a transversely extending shaft, or pivot means, 72 (FIG. 6) which corresponds to previously-mentioned shaft 27.

Suitably journaled on opposite ends of shaft 72 are shafts, such as shaft 74 which extend outwardly of the chamber through openings, such as opening 76, provided in the sides of the chamber and having the configuration shown. Considering the connection provided along each side of the chamber for shafts 74, each shaft is provided with a threaded bore 74a (FIG. 6) which receives an elongated threaded bar 78. Bar 78 includes an enlarged portion 78a and the upper end of the bar is journaled in a mounting 80 with head portion 78a disposed against the top of the mounting. Turning of bars 78 about their longitudinal axes results in adjustment of the vertical position of shaft 72.

Mounting 80 is suitably joined to a plate 82 which includes an elongated central slot 82a accommodating passage of shaft 74 through the plate. Plate 82 is mounted on the side of the chamber through releasable fasteners 84 which extend through horizontally extending slots 82b provided in the plate. The plate and bar 78 provided on either side of the chamber for shaft 72 are referred to herein collectively as positioning means.

With arms 70 constructed in the manner shown to hold rails 68 in a substantially horizontal plane, the rails directly overlie and substantially parallel the top of a bale during shredding. The rails thus support a relatively large area of the top of the bale to hold it securely against upward movement during shredding. And, through adjustment of the positions of plates 82 on the sides of the chamber, and through controlling the elevation of transverse shaft 72 by adjusting bars 78, the hold-down assembly may easily be adjusted to accommodate bales of many different sizes.

Turning now to FIGS. 7 and 8, here there is shown a modified shredding machine wherein discharge conveyor belt 22 is included as part of an elevator 90 that is mounted for side-to-side swinging about an upright axis.

More specifically, the elevator includes an elongated housing 92 having the configuration illustrated, with the housing completely enclosing the upper run of conveyor belt 22. The housing is pivotally mounted on the top and bottom in chamber 10 through suitable upper and lower pivot connections 94, 96, respectively. Pivot connections 94, 96 are vertically aligned with one another, and provide an upright pivot axis for the elevator. Thus, and referring particularly to FIG. 8, pivot connections 94, 96 permit side-to-side swinging of the elevator relative to chamber 10 between positions such as position A (where the elevator is shown in solid outline swung upwardly of the chamber), and position B (where the elevator is shown in dash-dot outline swung downwardly of the chamber).

Opposite sides in housing 92 are joined to adjacent opposite sides 11 in the chamber through a pair of elongated, upright, flexible baffles 97. The baffles are made of any suitable material such as thin sheet rubber. These baffles accommodate swinging of the elevator while preventing shredded material from escaping through the spaces between the sides of the elevator and the sides of the chamber.

Considering the mounting provided for belt 22, the lower, infeed end of the belt extends into chamber 10 adjacent the cutters, and is trained over a sprocket wheel 98. Wheel 98 is rotated under power by a suitable drive means through a shaft 100 journaled on housing 92. The upper, discharge end of the belt is trained over a sprocket wheel 102 mounted on a shaft 104 which is journaled on housing 92.

Anchored to housing 92 adjacent pivot connection 94, and extending over the top of chamber 10, is an elongated arm 106. Suitably fastened to the end of the arm spaced from pivot connection 94 is a traveler element 110 having a threaded bore (not shown) receiving an elongated threaded shaft 112. Shaft 112 is journaled for rotation about a substantially horizontal axis in a mounting 114. Mounting 114, in turn, is journaled for rotation about an upright axis on a post 116 anchored to top 12 in the chamber. Fastened to an end of shaft 112 as shown is a crank handle 118.

With turning of shaft 112 through operation of handle 118, element 110 travels along shaft 112. Travel of element 110 in turn, through the action of arm 106, causes swinging of the elevator.

It will be appreciated that a swingable elevator as described herein is particularly useful in operations where it is desired to distribute shredded material over a relatively wide area. Such an elevator, for example, greatly minimizes the amount of maneuvering required to reposition the machine as a whole whenever it is desired to deposit shredded material at a new location.

FIGS. 9 and 10 illustrate raker means employed in a modified form of the invention to produce more complete cutting and shredding action, particularly with bales of tightly compacted material. The raker means, in a preferred embodiment, comprises a pair of raker assemblies, such as assemblies 120, 122, mounted on each disc in the shredder as shown, with the assemblies positioned at 180° to each other.

Assembly 120 includes an elongated tooth 124 disposed against the far side of the disc in FIG. 9, and having its outer end projecting radially outwardly from the periphery of the disc. The tooth is fastened to the disc by means of an elongated bolt 126 and a nut 128 screwed onto the bolt. The threaded end 126a of bolt 126 projects axially to the side of the disc which is nearer the viewer in FIG. 9 (to the right of the disc in FIG. 10). A block 130 welded to the disc at the location shown prevents skewing of tooth 124.

Assembly 122 is similar to assembly 120, but is mounted on the disc in a reverse fashion. Thus, assembly 122 includes a tooth 132 disposed against the near side of the disc in FIG. 9, and a bolt 134 and nut (concealed) fastening the tooth to the disc. The threaded end 134a of the bolt (shown in dashed outline) projects axially to the far side of the disc in FIG. 9. A block 136 corresponding to block 130 is welded to the disc to prevent skewing of tooth 132.

During a shredding operation, the teeth and projecting bolt ends in the raker assemblies cooperate with cutters 21 to shred and break up a bale.

It is to be understood that the invention is not strictly limited in its application to the details of construcion and arrangement of parts shown in the drawings, because those skilled in the art will appreciate that various changes and modifications may be made without departing from the spirit and scope of the invention which is intended to be limited only by the accompanying claims.

It is claimed and desired to be secured by Letters Patent:

1. A bale-shredding machine comprising a chamber for receiving a bale of hay or the like, means for moving a bale into the chamber, means for moving shredded material out of the chamber, cutting means in the chamber including a shaft extending therethrough and a plurality of cutterheads mounted on the shaft with the diameters of the cutterheads varying a size from large at the ends to small at the center of the shaft, a bale hold-down assembly mounted in the chamber adjacent the cutting means and adapted to engage a top portion of a bale during shredding, and yieldable connector means operatively interposed between said hold-down assembly and said chamber adapted yieldably to hold the assembly against the top of a bale and to permit the assembly to move upwardly free of the top of a bale when predetermined pressure is applied against the assembly.

2. The machine according to claim 1 which further comprises an arcuate deflector in said chamber adjacent said cutting means for deflecting shredded material onto said means for moving shredded material out of the chamber.

3. The machine according to claim 1, wherein one end of said hold-down assembly is mounted on the chamber through pivot means spaced from the cutting means, said pivot means accommodating swinging of the assembly about a substantially horizontal axis that extends transversely of the chamber, the other end of the assembly is positioned closely adjacent the cutting means, and said connector means includes an elongated arm that extends upwardly from said other end, with the arm yieldably connected to the top of the chamber.

4. The machine according to claim 3, wherein said connector means further comprises a shear pin operatively interposed between said arm and the top of the chamber.

5. The machine according to claim 4 wherein said connector means further includes infinitely adjustable means operatively connected to said arm for adjusting the vertical position of the hold-down assembly relative to the cutting means.

6. The machine according to claim 5, wherein said connector means further comprises biasing means operatively interposed between said arm and said adjustable means yieldably urging said arm and adjustable means away from one another.

7. The machine according to claim 3, wherein the bale hold-down assembly includes a portion adjacent said other end which, during shredding of a bale, directly overlies and engages, and substantially parallels, the top of the bale.

8. The machine according to claim 7 which further comprises positioning means operatively interposed between said pivot means and said chamber for adjusting the position of the pivot means on the chamber.

9. The machine according to claim 1 and in which each cutterhead comprises a disc having four cutting elements mounted in its periphery at 90° to each other.

10. The machine according to claim 1 and in which the forward edge of the floor area in the chamber which supports a bale during shredding is forwardly tapered so that its profile corresponds with that of the cutterheads.

11. The machine according to claim 1 and in which the bottom of the chamber is stepped in the region intermediate said means for moving a bale into the chamber and said means for moving shredded material out of the chamber so as to provide at least two different levels in the chamber.

12. The machine according to claim 11 and in which the higher level supports a bale during shredding and the lower level is directly beneath the cutting means.

13. The machine according to claim 1, wherein the means for moving shredded material out of the chamber comprises an elevator including a housing hinged to the chamber for swinging back and forth about a substantially upright axis, and a traveling conveyer extending along and through the housing and into the interior of the chamber adjacent the cutting means.

14. The machine according to claim 1 and in which the yieldable connector means comprises an arm extending from the assembly through the top of the chamber, and a shear pin connecting the arm to the top.

15. The machine according to claim 1 and in which an infeed conveyer carries bales in one side of the chamber and an outfeed conveyer carries shredded material out the opposite side of the chamber.

16. The machine according to claim 9 which further includes raker means cooperating with said cutting elements, said raker means comprising a pair of raker assemblies mounted adjacent the periphery of each disc, with each assembly including a tooth projecting radially outwardly of the periphery of the disc and a bolt end projecting axially to one side of the disc.

17. The machine according to claim 1, wherein said hold-down assembly comprises a plurality of elongated rails spaced across the chamber having lengths which vary in a manner related to the varying diameters of said cutterheads.

References Cited

UNITED STATES PATENTS

| | | |
|---|---|---|
| 1,910,382 | 5/1933 | Doyle. |
| 2,488,799 | 11/1949 | Bonnafoux. |
| 2,681,090 | 6/1954 | Hicks et al. _____ 146—119 |
| 3,128,054 | 4/1964 | Beiler. |

W. GRAYDON ABERCROMBIE, Primary Examiner

U.S. Cl. X.R.

146—119